United States Patent
Vossenkaul et al.

(10) Patent No.: US 7,160,454 B2
(45) Date of Patent: Jan. 9, 2007

(54) MEMBRANE FILTER FOR WATER TREATMENT

(75) Inventors: Klaus Vossenkaul, Aachen (DE); Stefan Schafer, Aachen (DE)

(73) Assignee: Koch Membrane Systems GmbH, Aachen (DE)

( * ) Notice: Subject to any disclaimer, the term of this patent is extended or adjusted under 35 U.S.C. 154(b) by 0 days.

(21) Appl. No.: 11/419,054

(22) Filed: May 18, 2006

(65) Prior Publication Data

US 2006/0196831 A1 Sep. 7, 2006

Related U.S. Application Data

(63) Continuation of application No. 10/380,568, filed as application No. PCT/EP01/09788 on Aug. 24, 2001.

(30) Foreign Application Priority Data

Sep. 13, 2000 (DE) .................. 100 45 227

(51) Int. Cl.
*B01D 63/02* (2006.01)
*B01D 63/04* (2006.01)

(52) U.S. Cl. .................. 210/321.67; 210/321.69; 210/321.79; 210/321.88; 210/433.1; 210/500.23; 210/485

(58) Field of Classification Search .......... 210/321.67, 210/321.69, 321.79, 321.88, 433.1, 500.23
See application file for complete search history.

(56) References Cited

U.S. PATENT DOCUMENTS 4,002,567 A * 1/1977 Konno et al. .......... 210/333.01
4,876,006 A * 10/1989 Ohkubo et al. ......... 210/321.69

FOREIGN PATENT DOCUMENTS

JP 05154356 A * 6/1993

* cited by examiner

*Primary Examiner*—Krishnan S. Menon
(74) *Attorney, Agent, or Firm*—Faegre & Benson LLP

(57) ABSTRACT

The invention relates to a membrane filter for water treatment, comprising a head piece including a permeate collecting chamber with a permeate outlet, and at least one fiber bundle made from capillary membranes, which are secured into the head piece with an end that is open towards the permeate collecting chamber and sealed on the opposite end thereof. The head piece contains an air duct to which the mouth piece that protrudes into the fiber bundle is connected with at least one air outlet. At its other end, the fiber bundle terminates in freely movable manner in the untreated water.

18 Claims, 2 Drawing Sheets

MEMBRANE FILTER FOR WATER TREATMENT

RELATED APPLICATIONS

This application claims priority to U.S. application Ser. No. 10/380,568, filed Aug. 1, 2003 and entitled "Membrane Filter For Water Treatment." U.S. application Ser. No. 10/380,568 having Publication No. US2004/0035779 claims priority to PCT/EP2001/09788, international filing date of Aug. 24, 2001, which claims priority to German Application No. 10045227.2, filed Sep. 13, 2000, the entire disclosures of each of these documents are hereby incorporated by reference.

BACKGROUND

A membrane filter having capillary membranes of the membrane filter that can be used in immersion operation that are clamped between two head pieces at their ends is known from WO 98/28066. A gasification device is connected at the one head piece, which is the lower one in operation. The other, upper end contains the permeate collecting chamber. It forms a displacement body, which has the effect of displacing the rising air bubbles towards the outside of the membrane fiber bundle. Effective gasification is no longer guaranteed in the upper region of the fiber bundle. Here, no membrane movements are possible either, or only slight membrane movements are possible. As a consequence, the formation of membrane cover layers and of gross dirt deposits occurs in the upper region of the fiber bundle.

In a membrane filter known from DE 198 11 945 A1, the fiber bundle of capillary membranes is set into a pressure-resistant mantle pipe, through which the flow passes in the lengthwise direction of the capillary membranes. The capillary membranes are secured into an in-flow base at their ends, which base has a plurality of bores uniformly distributed over its cross-section, to allow the untreated water to flow through. In order to prevent cover layers from forming on the outside of the capillary membranes, and to prevent the micropores of the capillary membranes from becoming blocked, a uniform flow through the membrane filter chamber, at a defined flow velocity, is required. In order to improve the material exchange, the untreated water can be gasified with air before it enters into the membrane filter chamber. Sufficient air distribution within the fiber bundle is not guaranteed. The air is essentially guided along the outside of the membrane bundle, with the untreated water flow, and does not make any effective contribution to the membrane purification effect.

SUMMARY OF THE INVENTION

The invention relates to a membrane filter for water treatment, comprising a head piece including a permeate collecting chamber with a permeate outlet, at least one fiber bundle made from capillary membranes, which are secured into the head piece with an end that is open towards the permeate collecting chamber and individually sealed on the opposite end thereof, and a gasification device with a mouth piece that has at least one outlet for air and extends essentially parallel to the capillary membranes, within the fiber bundle, whereby the capillary membranes of the fiber bundle that are surrounded by the untreated water to be treated are attached, in a dense packing, to a connecting surface of the head piece, and clarified liquid can be withdrawn in the capillary membranes, to the permeate collecting chamber. The capillary membranes possess a diameter of less than 5 mm and preferably have the permeability of microfiltration membranes or ultrafiltration membranes. However, the use of capillary membranes for reverse osmosis or nanofiltration is not supposed to be precluded. Capillary membranes in a diameter range between 0.5 and 3 mm are preferred. The driving force for the membrane filtration is a pressure difference that can be implemented on the permeate by means of a pressure reduction. A pressure reduction on the permeate side is a particular possibility if the membrane filter is supposed to be used in immersion operation and is suspended in a basin that contains the untreated water, e.g. the activated sludge basin of a sewage treatment plant.

The invention is based on the task of indicating a membrane filter for water treatment in which effective gasification over the entire length of the fiber bundle is guaranteed, and an effective transport to remove membrane deposits that come loose from the membrane surfaces is assured.

This task is accomplished, according to the invention, in that the head piece contains an air duct to which the mouth piece that protrudes into the fiber bundle is connected, and that the fibers of the bundle terminate, at their other ends, without being clamped in place, in freely movable manner in the untreated water. The air that exits from the mouth piece flows through the fiber bundle from the inside to the outside, and partially flows away in the lengthwise direction of the capillary membranes. The air feed is preferably supplied intermittently, with the goal of cleaning off cover layers that have formed on the membrane surface during membrane filtration. The air introduction into the fiber bundle, according to the invention, allows surprisingly effective cleaning, independent of the flow velocity of the untreated water. In this regard, the membrane filter according to the invention can also be used in immersion operation.

The mouth piece possesses a pipe-shaped section, for example, with bores on the circumference, or is structured as a ring gap nozzle, from which the air exits radially or at least with a radial movement component. The air can be introduced into the fiber bundle in targeted manner by means of sizing the length of the mouth piece and by the arrangement of the exit bores or exit nozzles. It also proves to be advantageous if the mouth piece has a kick-back valve that closes if the pressure of the air feed drops.

The fiber bundle is attached to a connecting surface of the head piece, in a dense packing; in case of immersion operation of the membrane filter, this connecting surface is not penetrated by flow channels for the untreated water. The capillary membranes, which are sealed at their free ends, move in the untreated water to be filtered, since they are only clamped in place at one end. To limit the lateral movements of the fiber bundle, a basket can be set onto the head piece around the fiber bundle. The basket can be made of rods or, for example, can consist of a pipe that has been provided with openings on its circumference. The head piece can furthermore have connecting devices for attachment to a frame, which can be lowered into a basin that contains the untreated water. It lies within the scope of the invention to structure the head piece in block shape, whereby the permeate run-off takes place at a narrow side surface or at the bottom. Several of these units can be arranged next to one another, in the form of a filter package, whereby it is practical if the permeate outlets are connected with one another by means of a collecting line.

If the membrane filter is used in immersion operation, no devices are required for making the untreated water flow against the capillary membranes. According to the invention, a fiber bundle is provided that contains the capillary membranes in a very dense packing, whereby the untreated water is guided past the fiber bundle on the outside, and air is introduced within the fiber bundle. Preferably the fiber bundle is arranged vertically in the untreated water in all the embodiments, whereby the capillary membranes are fixed in place on the head piece at their lower ends, and their upper end can move in the liquid. The air bubbles rise to the top essentially within the fiber bundle, and they are not entrained, or only entrained to a slight extent, by the liquid on the outside.

In the following, the invention will be explained in greater detail, using drawings that merely represent an exemplary embodiment.

DETAILED DESCRIPTION

Figure 1:
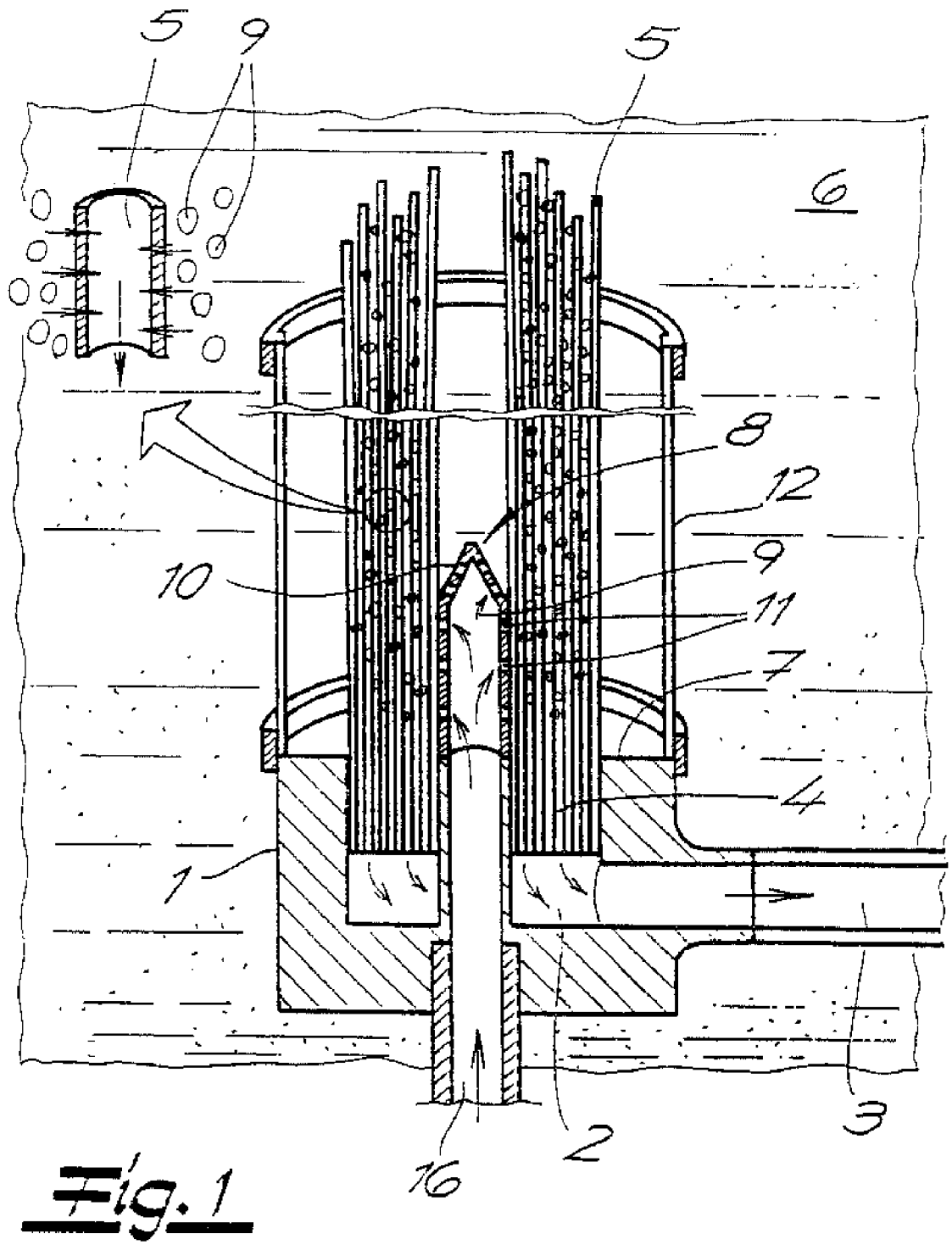
FIGS. 1 and 2 illustrate membrane filters for water treatment, according to the invention, which can be used in immersion operation, in lengthwise cross-section, in each instance.

The fundamental structure of the membrane filters according to the invention as shown in the figures includes a head piece 1, which has a permeate collecting chamber 2 with a permeate outlet 3, and at least one fiber bundle 4 made up of capillary membranes 5, which are sealed at one end and are secured into the head piece 1 at their other end, with an open end towards the permeate collecting chamber 2. The capillary membranes 5 are preferably ultrafiltration membranes or microfiltration membranes, the diameter of which is less than 5 mm. Preferably, the capillary membranes possess a diameter between 0.5 and 3 mm. The capillary membranes 5 are surrounded by the untreated water 6 that is to be treated. Filtration takes place on the basis of a trans-membrane pressure difference, which can be generated by means of an excess pressure on the untreated water side and/or by a reduced pressure on the permeate side. The clarified liquid flows off through the lumen of the capillary membranes towards the permeate collecting chamber 2 connected to the open end of capillary membranes 5.

The capillary membranes 5 of the fiber bundle 4 are attached, in a dense packing, to a connecting surface 7 of the head piece, which surface is not penetrated by flow channels for the untreated water. A gasification device 8, from which air exits, is arranged within the fiber bundle 4. The air feed preferably takes place intermittently, with the goal of cleaning off cover layers that have formed on the membrane surface during membrane filtration. In the embodiment shown in FIG. 1, the gasification device 8 has a protruding mouth piece 10 provided with at least one air outlet, which mouth piece extends essentially parallel to the capillary membranes 5 within the fiber bundle 4, and is connected to an air duct 16 that is arranged in the head piece 1. The mouth piece 10 has a pipe-shaped section with bores 11 on the circumference, but can also be structured as a ring gap nozzle, for example, from which the air exits with a radial alignment. The capillary membranes 5 secured into the head piece 1 at one end are freely movable at their other, sealed end, and perform more or less marked lateral movements under the effect of the turbulence that prevails in the untreated water and/or the flows that occur in the untreated water. To limit the lateral movements, a basket 12 is used, which is formed from rods and rings in the exemplary embodiment. A pipe that can be provided with perforations can also be used as the basket 12.

Figure 2:
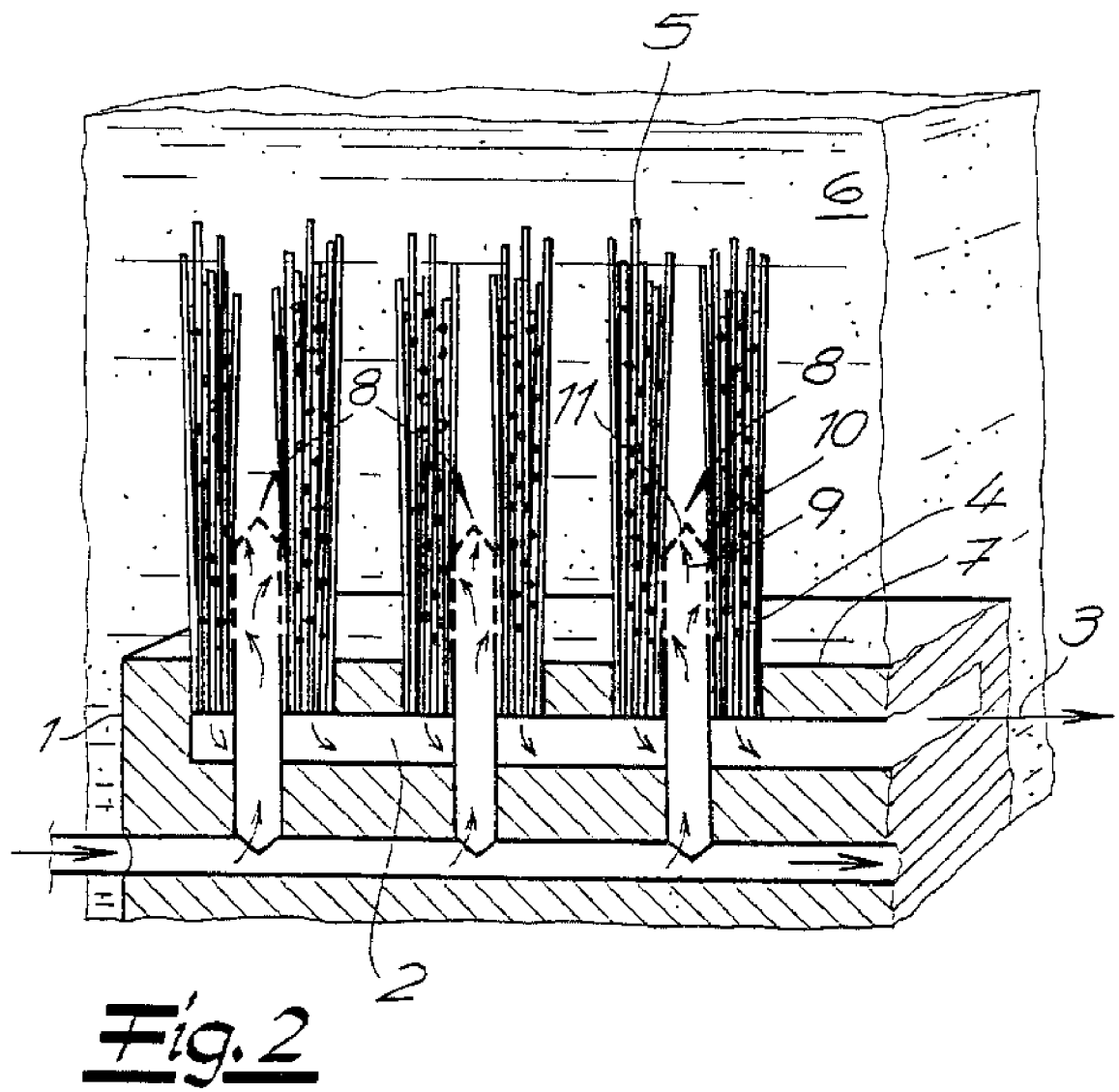

In the exemplary embodiment of FIG. 2, it is indicated that the head piece 1 can be structured as a block-shaped element. In the lengthwise direction of the head piece 1, a plurality of gasification devices 8 is arranged, in order to introduce air into the fiber bundle 4. The fiber bundle 4 consists of a dense packing of capillary membranes 5. The head piece 1 is suitable for immersion operation and can have connecting devices, not shown, for attachment to a frame, which can be lowered into a basin containing untreated water. The permeate outlet 3 is provided at the narrow face. In this regard, it becomes clear that a plurality of the head pieces 1 can be arranged parallel, next to one another.

The invention claimed is:

1. A head piece for a membrane filter to treat untreated water contained in a basin at an ambient pressure comprising:
   a) a permeate collecting chamber sealed from the untreated water and in fluid communication with a vertical bundle of capillary membranes where each capillary membrane has a first lower end open to the permeate collecting chamber and a sealed, freely movable second upper end opposite the first open end, wherein a pressure reduction on the permeate collecting chamber to less than the untreated water pressure provides a driving force for membrane filtration of the untreated water;
   b) an air duct contained in the head piece and connected to a mouth piece positioned within and surrounded by the capillary membranes, the mouth piece having at least one outlet for air to provide bubbles that flow through the bundle of capillary membranes from the inside to the outside of the bundle of membranes and partially flow away in the lengthwise direction, contact the capillary membranes over the length of the membranes to remove fouling materials from the membranes independent of the flow velocity of the untreated water and cause the membranes to sway; and
   c) a basket connected to the head piece to limit lateral sway of the capillary membranes.

2. The head piece of claim 1 wherein the basket is releasably connected to the head piece.

3. The head piece of claim 2 wherein the basket is formed from rods and rings.

4. The head piece of claim 2 wherein the basket comprises a pipe-shaped mantle having perforations.

5. The head piece of claim 1 further comprising connecting devices for attachment to a frame, which can be lowered into the basin that contains the untreated water.

6. The head piece of claim 1, wherein the mouth piece has a pipe-shaped section with bores on the circumference.

7. The head piece of claim 1, wherein the mouth piece is structured as a ring gap nozzle, from which air can exit radially.

8. A membrane module to filter untreated water contained in a basin at an ambient pressure comprising:
   a) a plurality of porous hollow fiber membranes in close proximity to one another having freely movable upper ends that are free to sway, when vertically immersed in the untreated water; and
   b) a head piece comprising:
      i) a permeate collecting chamber sealed from the untreated water and in fluid communication with a first lower open end of each hollow fiber membrane opposite a sealed, freely movable upper second end, wherein a pressure reduction on the permeate collecting chamber to less than the untreated water pressure provides a driving force for membrane filtration of the untreated water;
   ii) a gas duct contained in the head piece and connected to a mouth piece positioned within and surrounded by the hollow fiber membranes, the mouth piece having at least one outlet for a gas to provide bubbles that flow through a bundle of hollow fiber membranes from the inside to the outside of the bundle of membranes and partially flow away in the lengthwise direction, contact the hollow fiber membranes over the length of the membranes to remove fouling materials from the hollow fiber membranes independent of the flow velocity of the untreated water and cause the hollow fiber membranes to sway; and
  c) a basket connected to the head piece to limit lateral sway of the hollow fiber membranes.

9. The membrane module of claim 8 wherein the hollow fiber membranes are mounted relative to one another so as to produce a rubbing effect between the hollow fiber membranes when moved.

10. The membrane module of claim 8 wherein the basket is releasably connected to the head piece.

11. The membrane module of claim 10 wherein the basket is formed from rods and rings.

12. The membrane module of claim 10 wherein the basket comprises a pipe-shaped mantle having perforations.

13. The membrane module of claim 8 further comprising connecting devices for attachment to a frame, which can be lowered into the basin that contains the untreated water.

14. The membrane module of claim 8, wherein the mouth piece has a pipe-shaped section with bores on the circumference.

15. The membrane module of claim 8, wherein the mouth piece is structured as a ring gap nozzle, from which air can exit radially.

16. A liquid filtration system comprising:
  a) a tank containing a slow moving or captive feed liquid under ambient pressure;
  b) a membrane module comprising:
    i) a plurality of porous hollow fiber membranes positioned vertically in the tank in close proximity to one another, that are free to sway;
    ii) a head piece comprising:
      1) a permeate collecting chamber sealed from the feed liquid and in fluid communication with a first lower open end of each hollow fiber membrane opposite a sealed, freely movable second upper end; and
      2) a gas duct contained in the headpiece and connected to a mouth piece positioned within and surrounded by the hollow fiber membranes, the mouth piece having at least one outlet for a gas to provide bubbles that flow through a bundle of hollow fiber membranes from the inside to the outside of the bundle of membranes and partially flow away in the lengthwise direction, contact the hollow fiber membranes to remove fouling materials from the hollow fiber membranes independent of the flow velocity of the feed liquid and cause the hollow fiber membranes to sway;
  c) a source of suction connected to the permeate collecting chamber to apply a pressure less than the feed liquid pressure to the hollow fiber membranes to cause permeate to pass through pores in the hollow fiber membranes into the sealed permeate collecting chamber;
  d) a source of pressurized gas to supply continually or intermittently a gas to the gas duct to produce gas bubbles that move upwardly and parallel to and along the length of the hollow fiber membranes to scour external surfaces of the hollow fiber membranes; and
  e) a basket connected to the head piece to limit lateral sway of the hollow fiber membranes.

17. The filtration system of claim 16 further comprising a system to backwash the hollow fiber membranes with a liquid.

18. The filtration system of claim 17 wherein the liquid comprises permeate.

* * * * *